US012326747B1

(12) United States Patent
Varshney et al.

(10) Patent No.: US 12,326,747 B1
(45) Date of Patent: Jun. 10, 2025

(54) DUAL-MODE LOW DROPOUT REGULATOR WITH FAST TRANSIENT SWITCHING BETWEEN MODES

(71) Applicant: Cadence Design Systems, Inc., San Jose, CA (US)

(72) Inventors: Yashu Anand Varshney, Bangalore (IN); Sumilak Chaudhury, Kolkata (IN)

(73) Assignee: Cadence Design Systems, Inc., San Jose, CA (US)

( * ) Notice: Subject to any disclaimer, the term of this patent is extended or adjusted under 35 U.S.C. 154(b) by 219 days.

(21) Appl. No.: 18/082,720

(22) Filed: Dec. 16, 2022

(51) Int. Cl.
*G05F 1/563* (2006.01)
*G05F 1/575* (2006.01)

(52) U.S. Cl.
CPC .............. *G05F 1/563* (2013.01); *G05F 1/575* (2013.01)

(58) Field of Classification Search
CPC .......... G05F 1/462; G05F 1/465; G05F 1/468; G05F 1/56; G05F 1/575; G05F 1/562; G05F 1/563; G05F 1/565; G05F 1/567; G05F 1/569; G05F 1/571; G05F 1/573; G05F 1/5735
See application file for complete search history.

(56) References Cited

U.S. PATENT DOCUMENTS 8,648,586 B2 2/2014 Singh et al.
9,323,263 B2 * 4/2016 Jain ........................... G05F 1/56
9,651,967 B2 * 5/2017 De Haas ................. G05F 1/613
10,033,342 B2 * 7/2018 Ivanov ................ H03F 3/45273
10,817,114 B2 * 10/2020 Sasai ...................... G01R 27/26
10,943,558 B2 * 3/2021 Kumar ................... G09G 5/006
11,393,520 B1 7/2022 Kumar et al.
12,119,811 B2 * 10/2024 Onody ................... H03K 17/18
2023/0122789 A1 * 4/2023 Xiao ....................... G05F 1/563
323/273

FOREIGN PATENT DOCUMENTS

CN 107479610 A * 12/2017 ............ G05F 1/561

* cited by examiner

*Primary Examiner* — Jeffrey A Gblende
(74) *Attorney, Agent, or Firm* — Mark H. Whittenberger; Holland & Knight LLP

(57) ABSTRACT

The present disclosure relates to a dual mode, low dropout regulator circuit and method of using the same. The circuit may include a multiplexer configured to switch between a high-speed mode and a low-power mode and an error amplifier configured to generate an amplifier output. The circuit may include a class AB circuit configured to receive the amplifier output and generate a class AB output and a unity feedback circuit in electrical communication with the class AB circuit, wherein a single reference voltage is applied to perform a dual mode operation.

18 Claims, 19 Drawing Sheets

800

400

500

600

900

1000

1900

DUAL-MODE LOW DROPOUT REGULATOR WITH FAST TRANSIENT SWITCHING BETWEEN MODES

DISCUSSION OF THE RELATED ART

Voltage regulators are used for providing regulated voltage supply to electronic circuits. An example of a voltage regulator 100 is shown in FIG. 1. The voltage regulator 100 includes a p-type metal-oxide-semiconductor (PMOS) transistor 105, a device 110, and a capacitor 115. A load current flows through the device 110. The capacitor 115 is connected in parallel to the device 110. Examples of the device 110 can include an ammeter, a resistor or any current sensing device. The PMOS transistor 105 has a drain connected to an output terminal (VOUT), a gate, and a source connected to a voltage supply (VDD). A gate signal is provided to the gate to regulate the voltage being supplied to the output terminal.

In order to sense and measure the load current supplied by the voltage regulator 100, a series resistive element can be placed in series with the device 110, and the voltage drop across the resistive element can be measured using an analog to digital converter (ADC). The maximum value of the drop across the resistive element is VMAX=VIN−VDS_MIN−VOUT. VDS_MIN is the dropout tolerable across the PMOS transistor 105. Hence, the resistance of the resistive element is determined to be RMAX=VMAX/IMAX.

Given RMAX is determined as above, VMAX can be measured through the ADC. However, for a load current I significantly lower than the current IMAX, the input to the ADC would be scaled down by the ratio of I/IMAX. The voltage measurement would be limited by ADC's resolution. The finite resolution of the ADC limits the minimum detectable current through this arrangement with a good accuracy.

In some cases, the load current can be sensed using a current mirror circuit by dumping the mirrored current on a resistor, and sensing the voltage developed across the resistor with an ADC. However, sensing of the load current is limited by the resolution of the ADC.

SUMMARY

In one or more embodiments of the present disclosure, a dual mode, low dropout regulator circuit is provided. The circuit may include a multiplexer configured to switch between a high-speed mode and a low-power mode and an error amplifier configured to generate an amplifier output. The circuit may include a class AB circuit configured to receive the amplifier output and generate a class AB output and a unity feedback circuit in electrical communication with the class AB circuit, wherein a single reference voltage is applied to perform a dual mode operation.

One or more of the following features may be included. The unity feedback circuit and class AB circuit may electrically communicate with the multiplexer to switch between the high-speed mode and a low-power mode. The low dropout regulator may generate a first power supply in a low power mode. The low dropout regulator may generate a second power supply in a high speed mode. The low dropout regulator may be included in a display PHY (D-PHY) architecture. The second power supply may be provided to a pre-driver circuit. The pre-driver circuit may be a thin oxide device. The unity feedback circuit may include at least one capacitor operatively connected to a plurality of resistors arranged in parallel. The circuit may include a controller configured to provide a toggle signal to the multiplexer. The first power supply may be approximately 1.2 volts and the second power supply is approximately 0.9 volts.

In one or more embodiments of the present disclosure, a method of dual mode, low dropout regulator mode switching is provided. The method may include applying a single reference voltage at a unity feedback circuit in electrical communication with a class AB circuit to enable a dual mode operation. The method may also include switching, using a multiplexer, between a high-speed mode and a low-power mode. The method may further include generating an amplifier output using an error amplifier and receiving the amplifier output at the class AB circuit and generating a class AB output.

One or more of the following features may be included. The unity feedback circuit and class AB circuit may electrically communicate with the multiplexer to switch between the high-speed mode and a low-power mode. The low dropout regulator may generate a first power supply in a low power mode. The low dropout regulator may generate a second power supply in a high speed mode. The low dropout regulator may be included in a D-PHY architecture. The second power supply may be provided to a pre-driver circuit. The pre-driver circuit may be a thin oxide device. The unity feedback circuit may include at least one capacitor operatively connected to a plurality of resistors arranged in parallel. The method may include providing a toggle signal to the multiplexer via a controller. The first power supply may be approximately 1.2 volts and the second power supply is approximately 0.9 volts.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION

Figure 1:
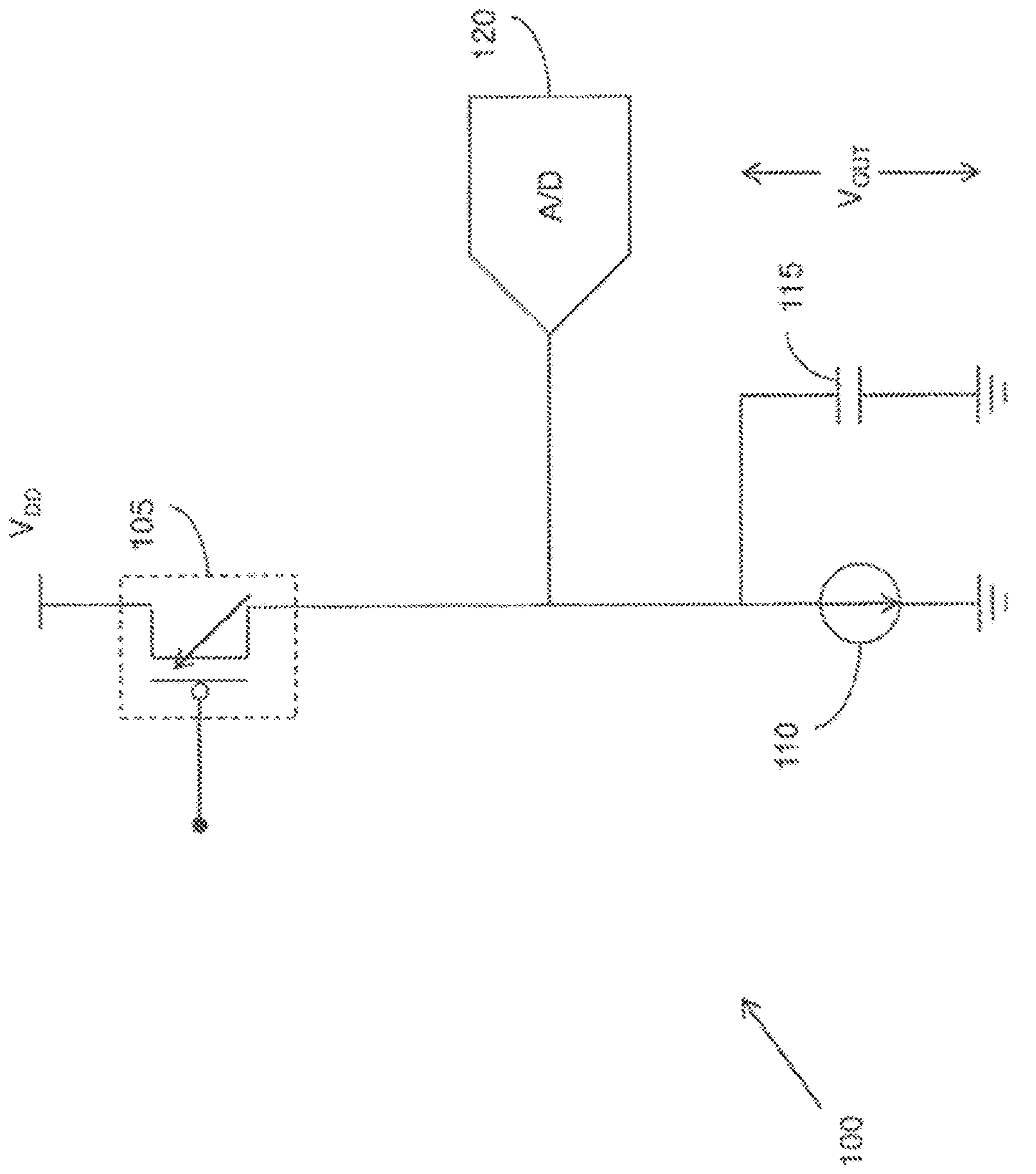
FIG. 1 Prior Art
FIG. 1 is a schematic diagram of a prior art voltage regulator.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

High-speed voltage mode (VM) transmitter (TX) drivers are ubiquitous in serial links due to the inherent power efficiency compared to current mode logic (CML) based designs. Typical VM TX drivers may include, but are not limited to, a complementary metal-oxide semiconductor (CMOS) (P-over-N) stage or N-type metal-oxide-semiconductor (NMOS) (N-over-N) stage. For a low-swing VM TX, an NMOS driver may reduce power consumption by operating at a low supply voltage, where low-swing may refer to a 400 mV peak to peak differential voltage. Such NMOS drivers require pre-driver stages that provide sufficient overdrive to the driver transistors, thus ensuring proper impedance matching to the channel. LDOs are required to provide supply to driver and pre-driver circuits.

As discussed above, embodiments of the present disclosure are related to low dropout regulators (LDOs). For additional information regarding LDOs please see U.S. Pat. Nos. 8,648,586 and 11,393,520, available from the Assignee of the subject application, each of which are hereby incorporated by reference in their entirety.

Display PHY (D-PHY), a forwarded clock architecture requires data (D) and clock (C) TX. D-PHY may refer to a protocol or specification for a physical layer for high-performance and cost-optimized devices such as cameras, displays, etc., as may be developed by the MIPI (Mobile Industry Processor Interface) Alliance. For example, D-PHY may be a PHY for smartphone, IoT, and/or automotive camera and display applications (e.g., low-power, high-speed applications for interconnect lengths up to 4 meters) and may feature high performance, low power, and low electromagnetic interference (EMI) for devices such as smartphone cameras and displays, smart watch displays, drones, surveillance cameras, robots, large tablets, in-sight (glass) products, in-car infotainment and dashboard displays, and/or automotive camera and radar sensors, where D-PHY may connect megapixel cameras and high-resolution displays to an application processor, providing a clock-forwarded synchronous link that may provide high noise immunity and high jitter tolerance. Each D/CTX lane consists of a high speed (HS) TX for fast data transfer and a low power (LP) TX for control transactions. As discussed above, LDOs are required to provide supply to driver and pre-driver circuits in the TX. An LDO may be local to a TX lane or may be present in a common lane (CMN) serving all of the TX lanes. CMN LDOs are difficult to design and scale as data-rates increase. Employing additional lane LDOs to overcome these CMN LDO impairments is not efficient in terms of power and area.

Accordingly, embodiments included herein are directed towards a single LDO operating in a dual mode that is capable of fast transient switching between modes. The proposed LDO eliminates the CMN LDO issues discussed above and eliminates the area and power overhead caused by an additional lane LDO.

Figure 2:
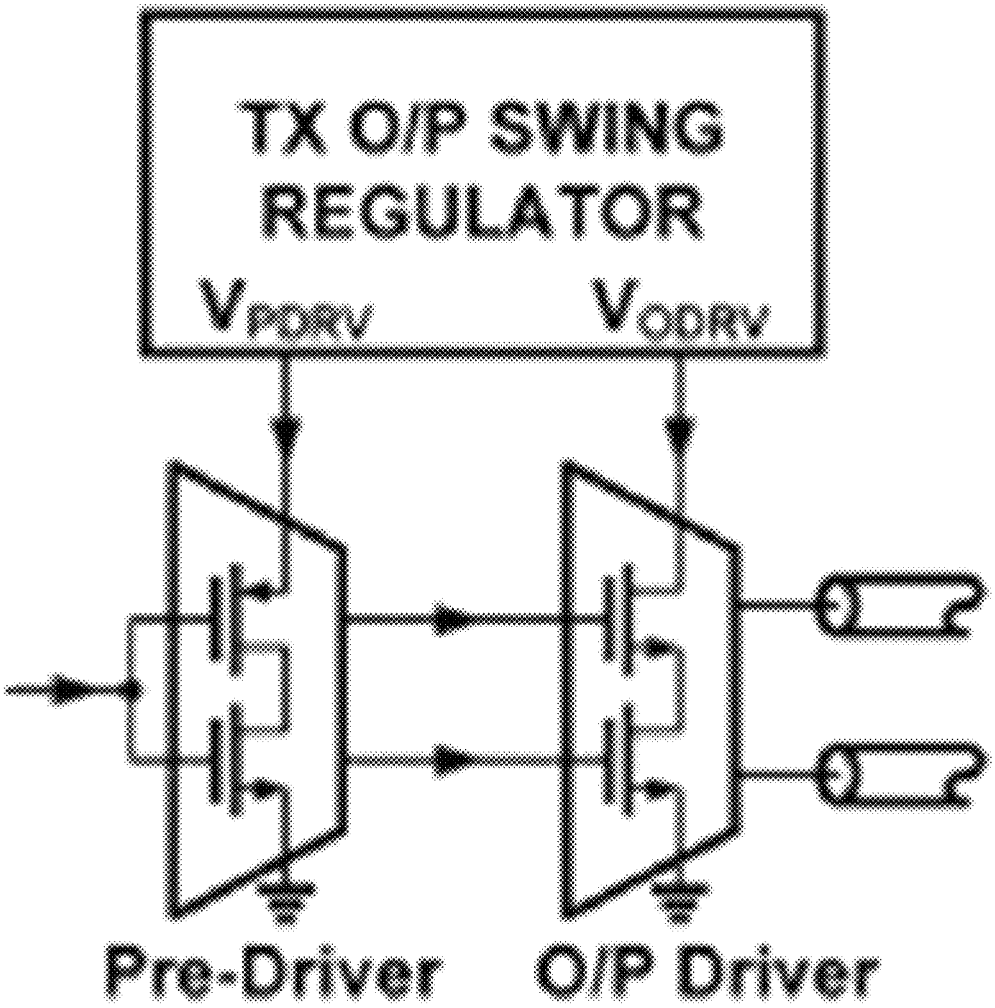
FIGS. 2-4 show examples of low swing voltage mode transmitters.
Figure 3:
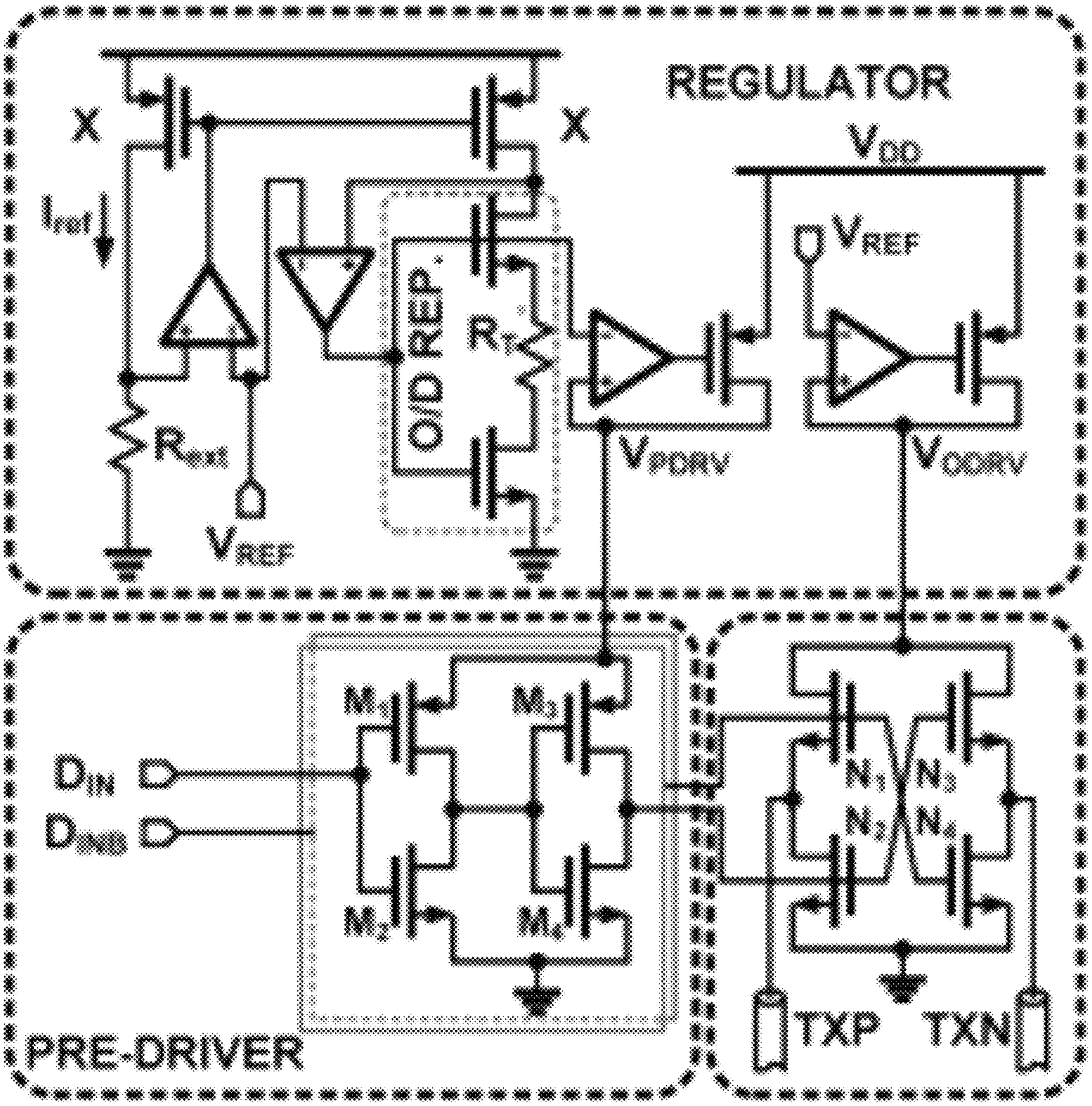
Figure 4:
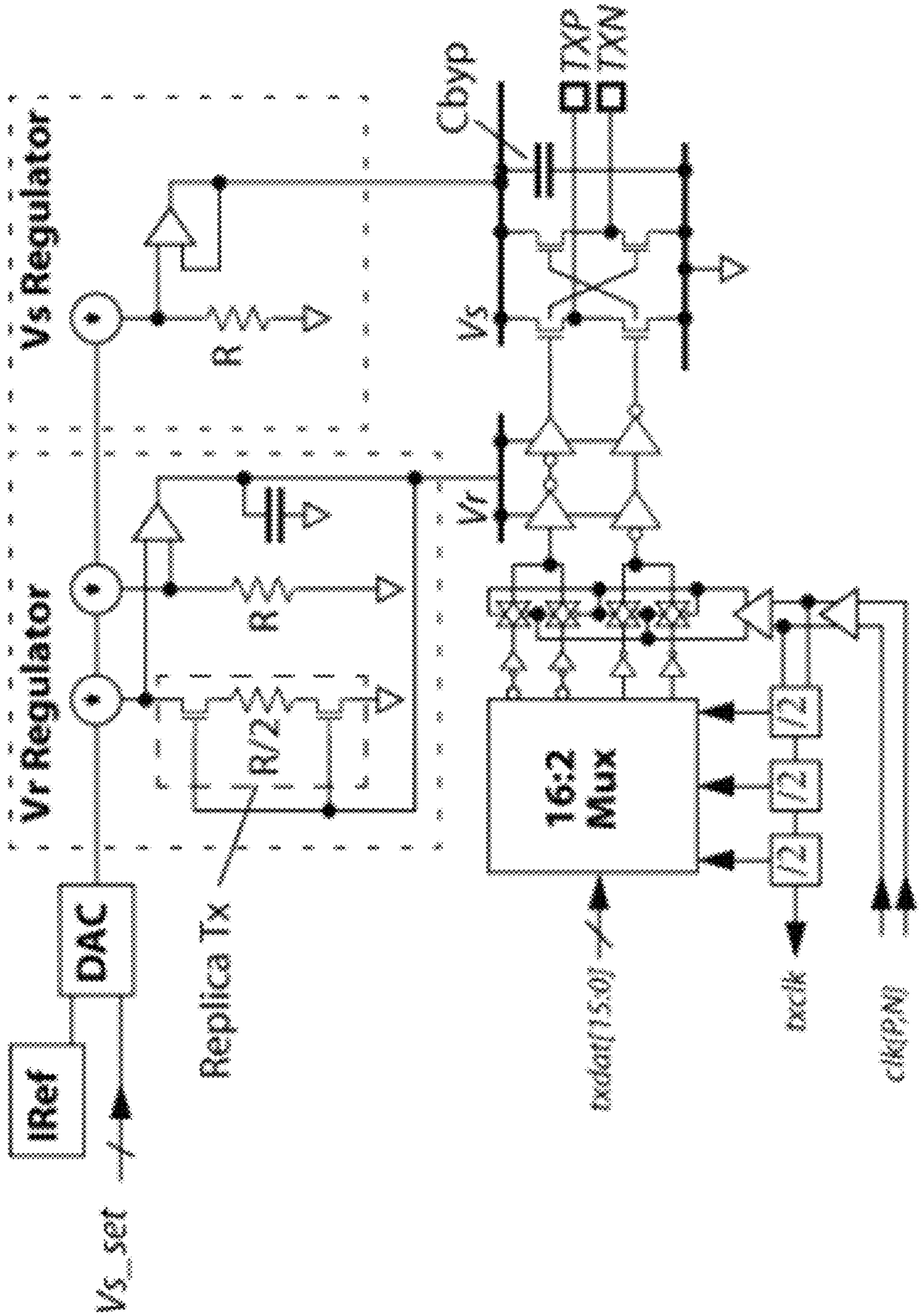

Current implementations of D-PHY1.2 (e.g., as may be developed by the MIPI Alliance) TX employs three LDOs—a) 0.4V LDO for the HSTX driver in the D/CTX lane, b) 1.2V LDO for the LPTX in the D/CTX lane and c) 0.9V LDO in the CMN to support all TX (HS pre-driver) lane configurations (1DTX/1CTX through 8DTX/2CTX). The CMN LDO suffers from a variety of issues. For example, it is not power efficient as it must be stable for all lane configurations and have a large bandwidth to support maximum lane configuration (8DTX/2CTX) at the highest data-rate. Further, its output must be routed to the farthest lane, which introduces a supply IR drop for all the lanes. Additional reference voltage programming may also be required to counter this IR drop. This approach may not be scalable since it cannot provide both large load current and high bandwidth at increased data rates for next generation D-PHY FIGS. 2-5 show example circuits from existing approaches. More specifically, FIGS. 2-3 show examples of low swing voltage modulator TX circuits as described in "*A 5 Gb/s Energy-Efficient Voltage-Mode Transmitter Using Time-Based De-Emphasis*", Saurabh Saxena et. al. FIG. 4 shows an example circuit as described in "*A 14-mW 6.25-Gb/s Transceiver in 90-nm CMOS*", J Poulton et. al.

In protocols such as D-PHY, the transmitter includes two drivers, a low power (LP) TX driver uses a 1.2V supply and a high speed (HS) TX driver uses a 0.4V supply. The pre-driver requires a 0.9V supply (higher than AVDD_Core) to provide optimal overdrive to the NMOS driver in the HS-TX, which necessitates the use of another LDO. This may be either a dedicated lane LDO or a CMN LDO for all lanes. The CMN LDO needs to provide current to the pre-driver in all lanes which is ~16 mA for 8 data 2 clock lanes operating at 2.5 Gbps (e.g., in D-PHY1.2). Routing from the CMN LDO to all lanes causes bandwidth limitations and a significant IR drop and the CMN LDO cannot provide both high current and high bandwidth at increased data rates. A separate lane LDO may be used for the pre-driver. This needs to provide required current and bandwidth for the highest data-rate and additional area and power consumption is needed in each lane in addition to the existing 0.4V and 1.2V LDOs.

Figure 5:
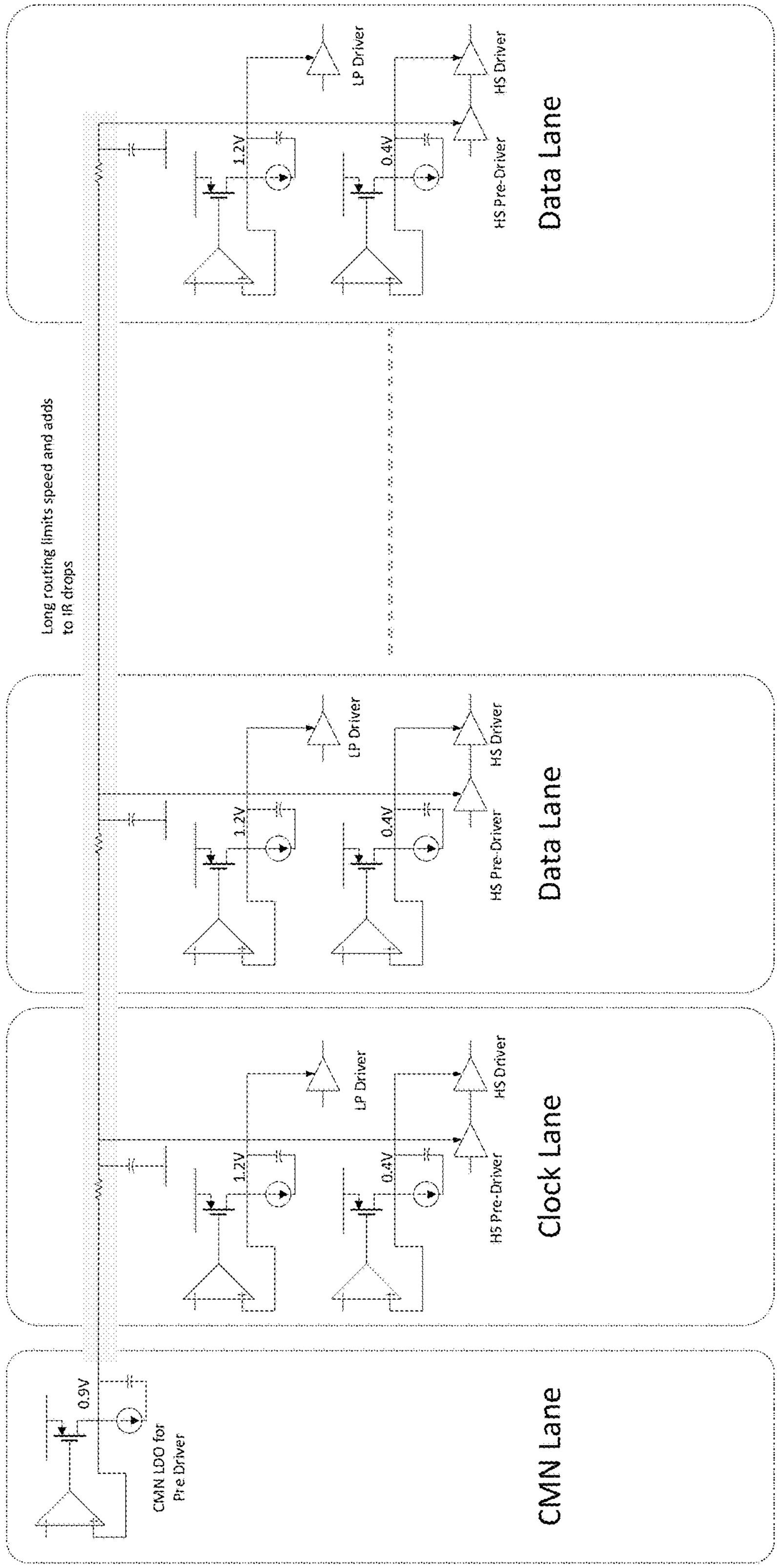
FIG. 5 shows an example D-PHY architecture having two-lane low dropout regulators (LDOs) and one common lane (CMN) LDO.

Referring now to FIG. 5, an existing D-PHY architecture is provided that has two lane LDOs and one CMN LDO. In this example, the lane LDOs support 1.2V for low power mode and 0.4V for high speed mode drivers respectively. The CMN LDO supports 0.9V for high speed pre-drivers for all of the clock and data lanes.

Figure 6:
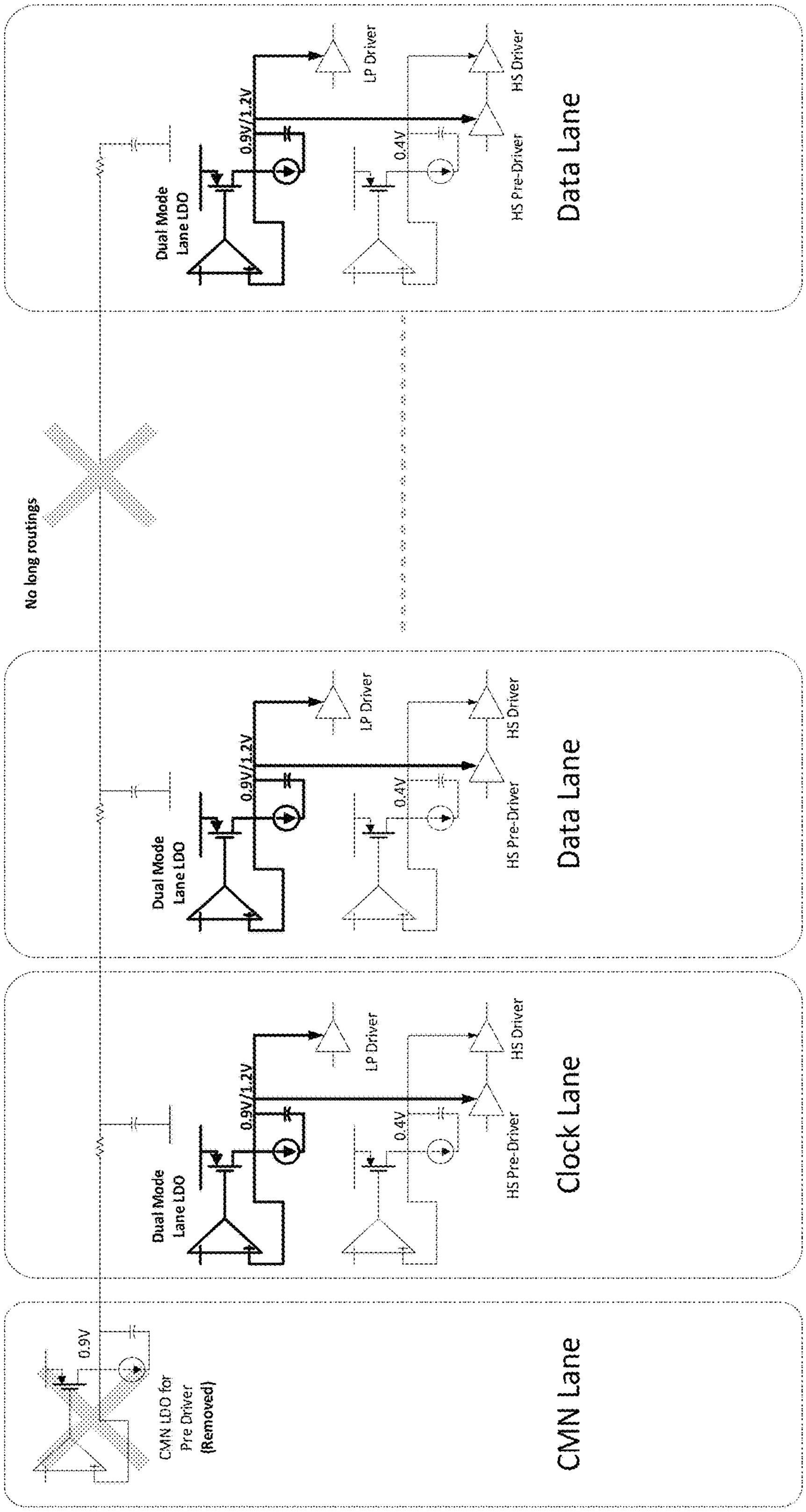
FIG. 6 shows an example D-PHY architecture with dual-mode lane LDO consistent with an embodiment of the present disclosure.

Referring now to FIGS. 6-19, embodiments consistent with the teachings of the present disclosure are provided. FIG. 6 depicts an example D-PHY architecture with dual-mode lane LDO consistent with embodiments of the present disclosure. In this particular example, a single LDO may be used to support both the 1.2V (low power mode) and the 0.9V (high speed mode) supplies.

In operation, the dual mode LDO described herein may support both 1.2V and 0.9V modes. In some embodiments, low power and high speed transmission may be mutually exclusive, hence a single LDO may be used to provide different supply levels. The absence of routing from the CMN LDO to the far end data lane eliminates IR drop and bandwidth limitation.

Embodiments included herein provide better power efficiency and stability for supporting higher data-rates since the LDO needs to support two loads in a single lane rather than all of the lanes and different configurations. To ensure reliability, during low power transmission, the low power driver is given 1.2V supply and the pre-driver is given the core supply (AVDD_Core). In some embodiments, during high speed transmission, the low power driver and the pre-driver both are given the 0.9V supply. Timing constraints due to LDO transition times between low power to high speed transitions and vice versa needs to be met.

Figure 7:
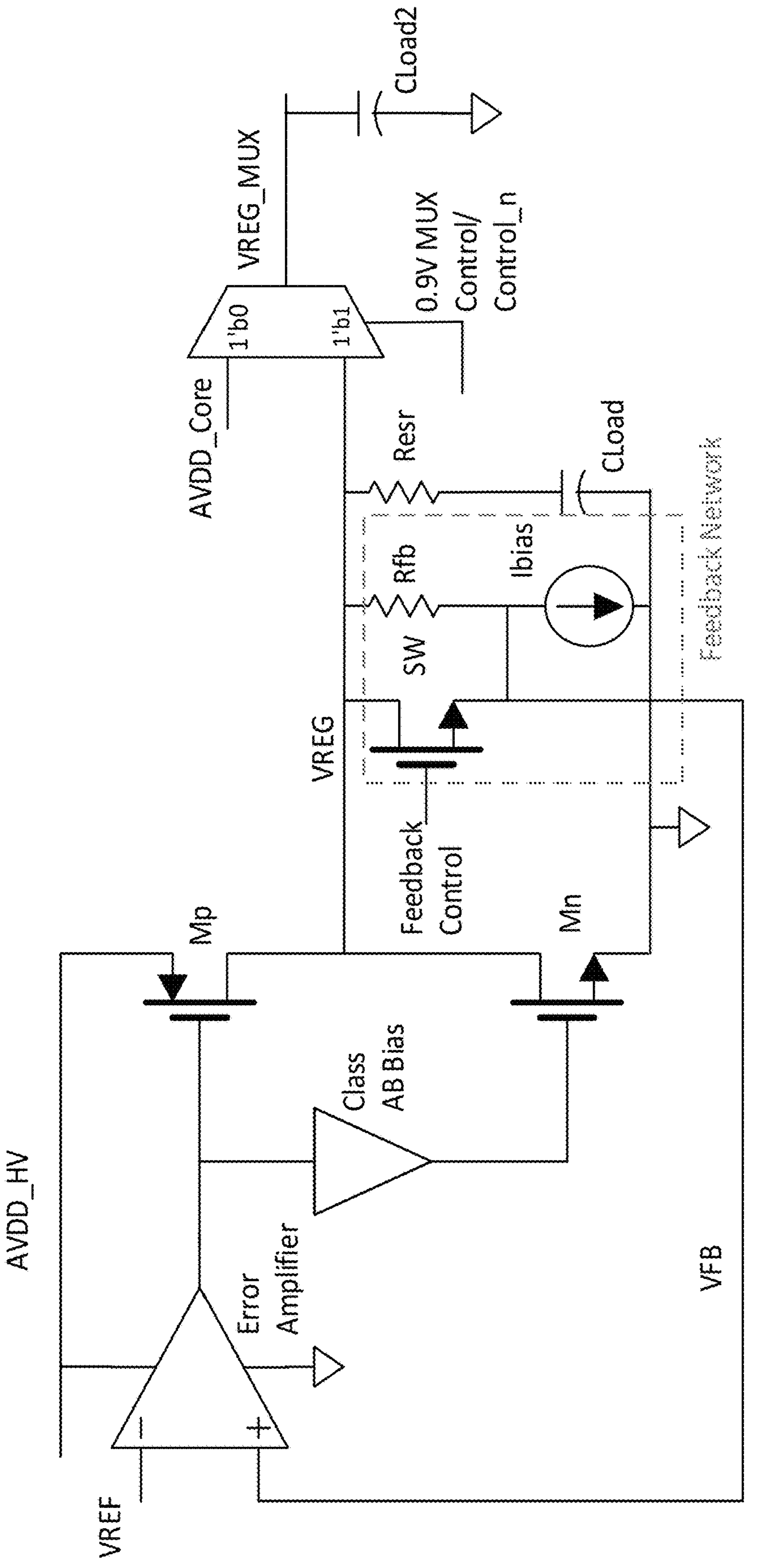
FIG. 7 shows an example dual-mode lane LDO architecture consistent with an embodiment of the present disclosure.

Referring now to FIG. 7, an embodiment showing an example dual-mode lane LDO architecture is provided. To achieve dual mode operation, the LDO may use feedback switching. This may ensure that bias points in the error amplifier remain similar across modes. Reference switching disturbs bias points within the error amplifier and inherently increases loop settling time. For low power to high speed mode transitions, a unity feedback configuration and class AB operation may be used. This may reduce settling time as feedback resistor Rfb is avoided on the discharge path. The class AB stage provides higher current for fast discharge. Feedback control and multiplexer (MUX) control signals need to be generated to ensure pre-driver reliability.

Figure 8:
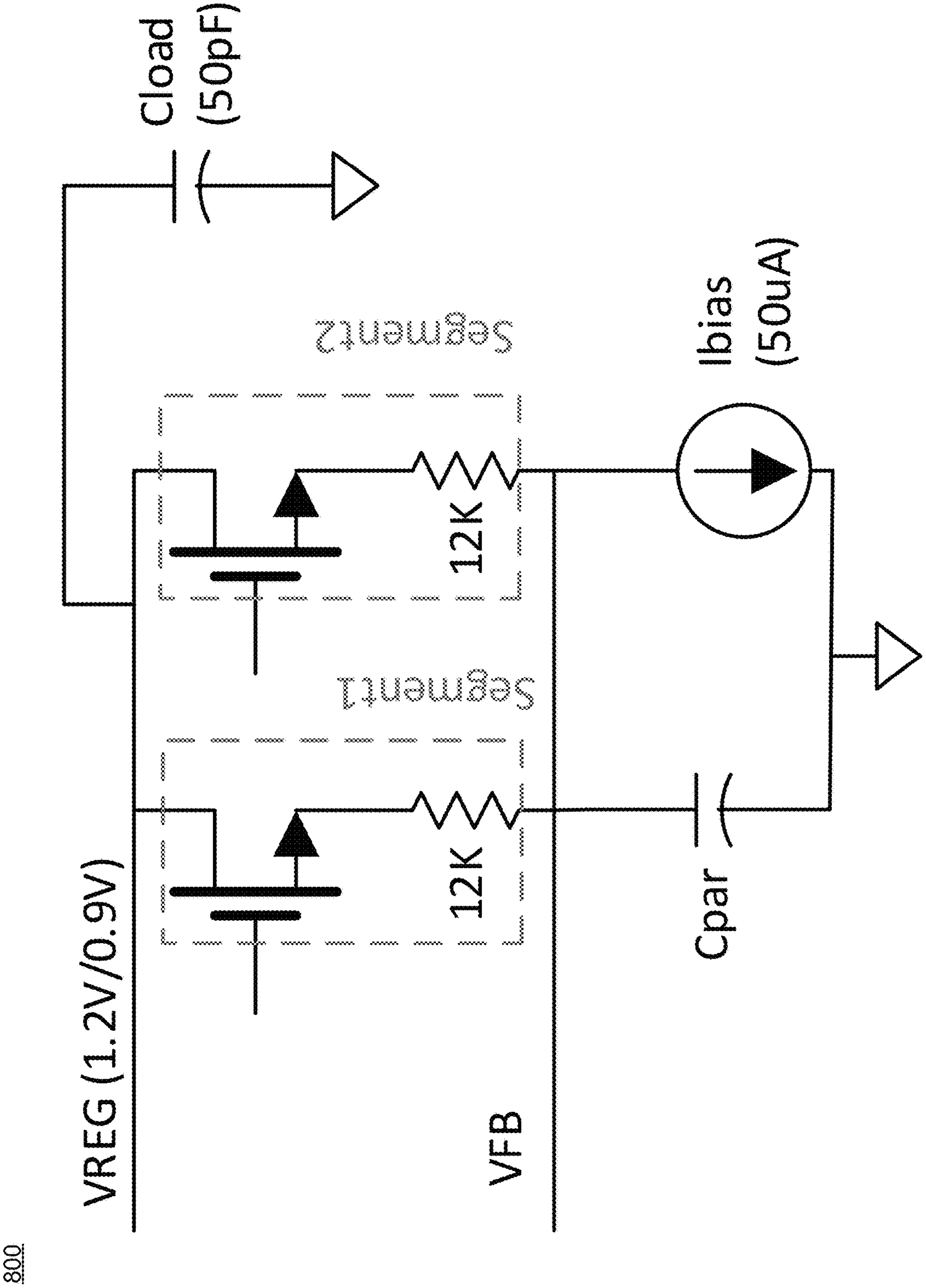
FIGS. 8-9 show example circuits illustrating settling time improvement using a unity feedback configuration consistent with an embodiment of the present disclosure.
Figure 9:
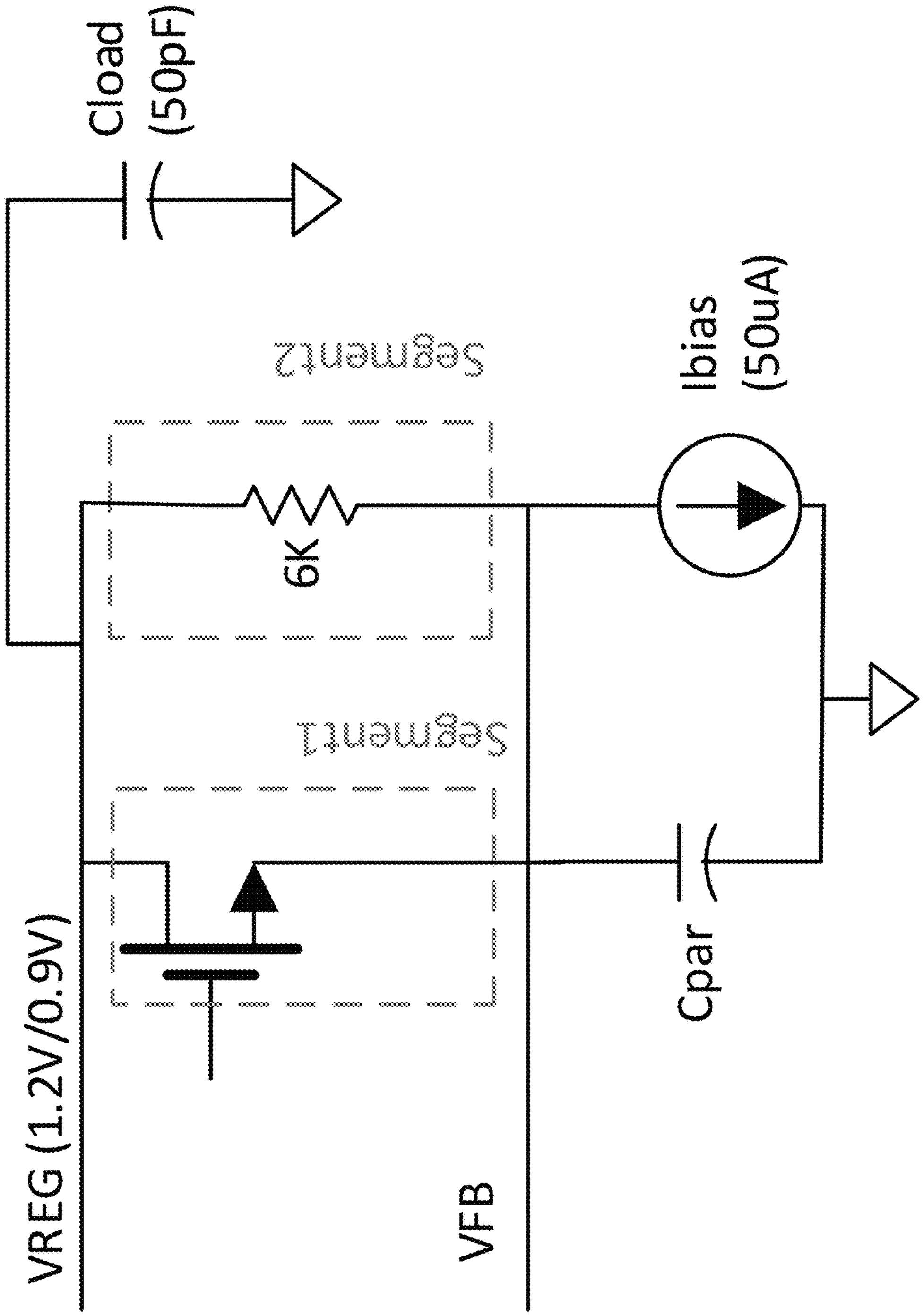

Referring now to FIGS. 8-9, embodiments depicting examples of a unity feedback configurations are provided. These particular arrangements result in a significant improvement in settling time. In operation, in order to change VREG from 1.2V to 0.9V, parallel segments of 12K may be used (as shown in FIG. 8), assuming a reference voltage of 0.6V In this example, "Cpar" corresponds to an input capacitance of the error amplifier and other routing parasitic components lumped into a single instance. When the LDO is switched from 1.2V to 0.9V, VFB sees an additional time constant due to resistor of segment 2 and Cpar. The associated settling time of this node, ignoring overall loop behavior can be ~10 ns. In contrast, if the LDO reference is set to 0.9V and only a switch in segment 2 shorts the already present 6K (earlier 12K) resistor, then this additional time constant may be avoided (as shown in FIG. 9). The above observations may be similar for a transition for 0.9V to 1.2V.

Figure 10:
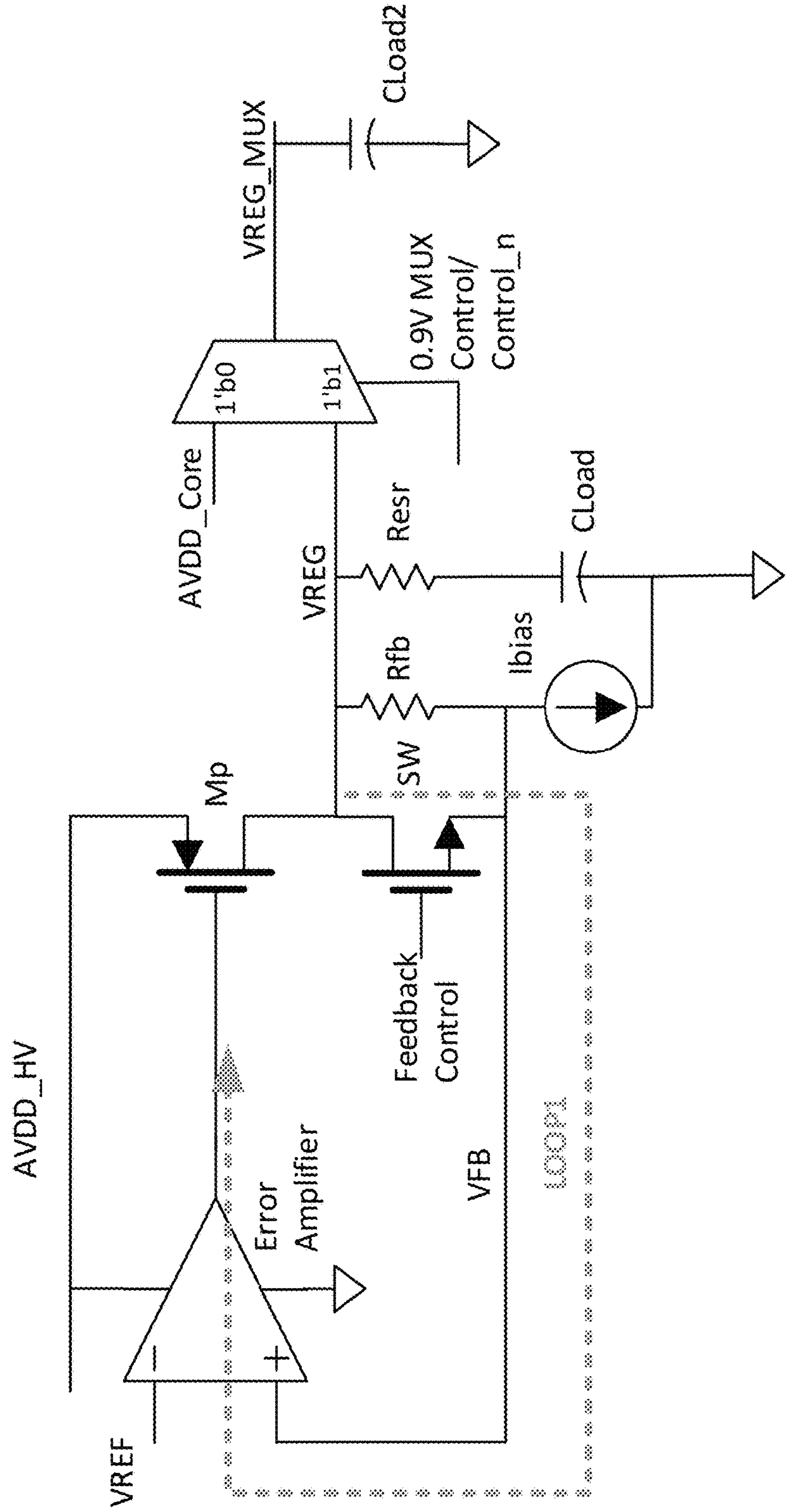
FIGS. 10-11 show example circuits illustrating settling time improvement using a class AB scheme consistent with embodiments of the present disclosure.
Figure 11:
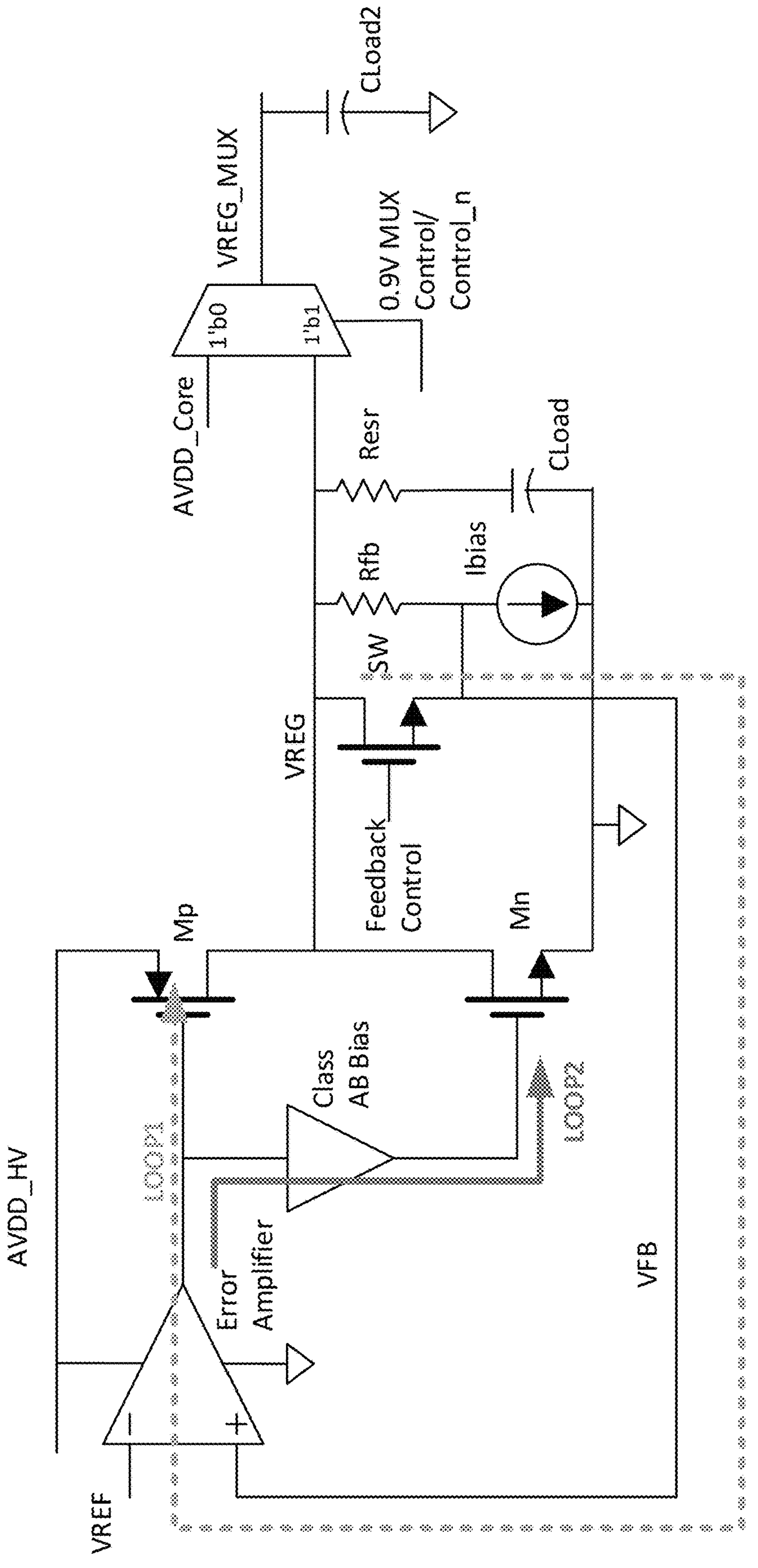
Figure 12:
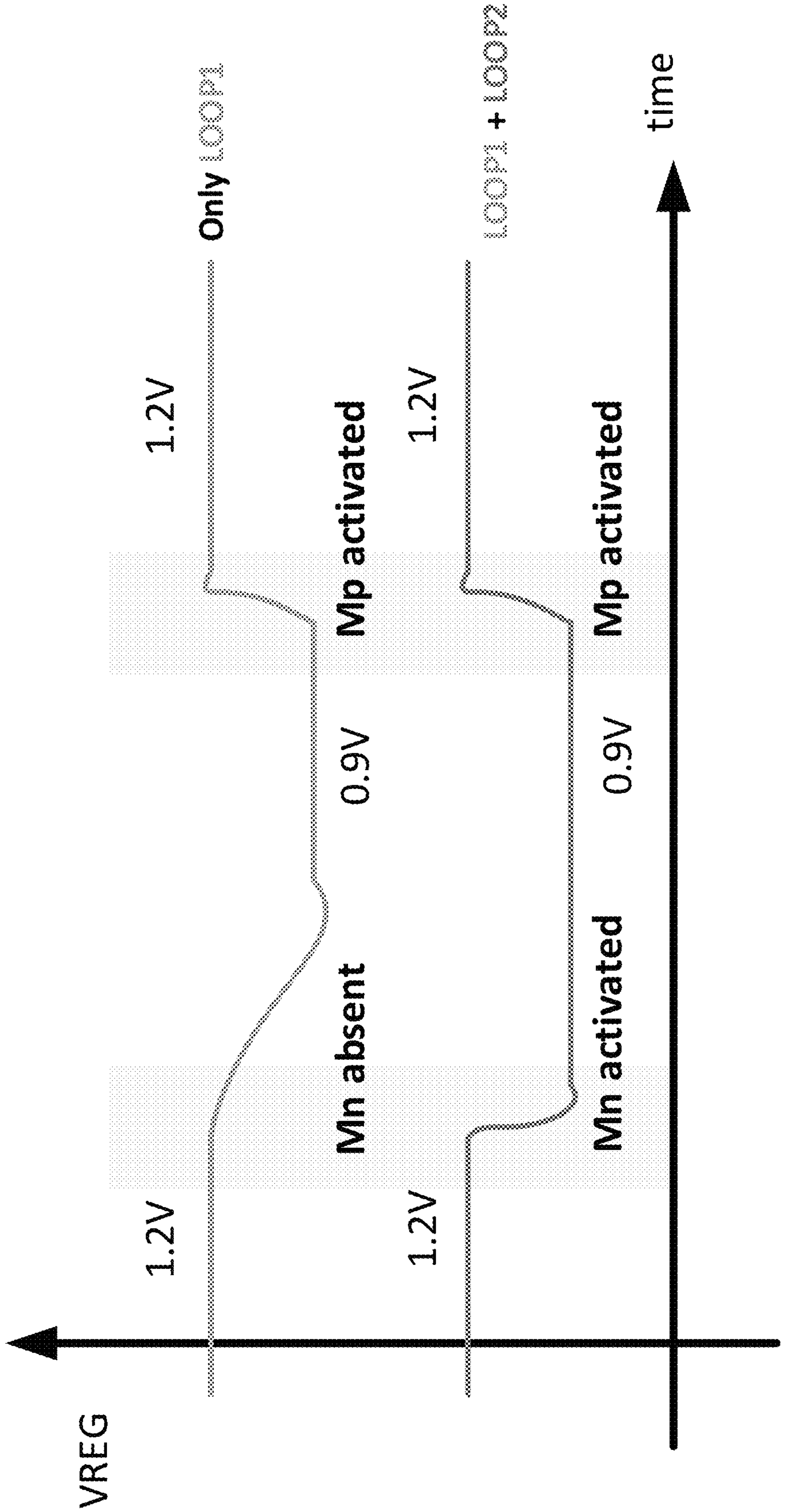
FIG. 12 shows an example plot showing the transition time of the circuits of FIGS. 10-11 consistent with an embodiment of the present disclosure.

Referring now to FIGS. 10-12, embodiments depicting a class AB configuration are provided. This particular arrangement may also result in a significant improvement in settling time. In operation, as the LDO switches from the 1.2V to 0.9V mode, loop 1 may attempt to pull up the gate of P-channel power MOS Mp. To discharge VREG from 1.2V to 0.9V, only Ibias (~50 uA) may be available, which results in a slow transition time (as shown in FIG. 12). Using the class AB scheme, the gate of NMOS Mn may be pulled up simultaneously along with feedback control. This provides more current to discharge the net VREG and mitigates slew rate limitations caused by Ibias (~50 uA). A carefully designed bias for Mn can reduce quiescent current and its variation.

In some embodiments, since the pre-driver circuit is designed using low Vt (thin ox) transistors, reliability needs to be addressed when LDO switches between 1.2V and 0.9V When VREG switches from 1.2V to 0.9V it may be desirable for the MUX to switch from AVDD_Core to VREG after the analog loop brings VREG close to 0.9V Similarly, when VREG switches from 0.9V to 1.2V it may be desirable for the MUX to switch from VREG to AVDD_Core before the analog loop starts pulling up VREG from 0.9V to 1.2V To ensure the above operability, some embodiments may utilize an LDO_Toggle signal and its delayed version (delayed by ~20 ns) provided by a controller.

Figure 13:
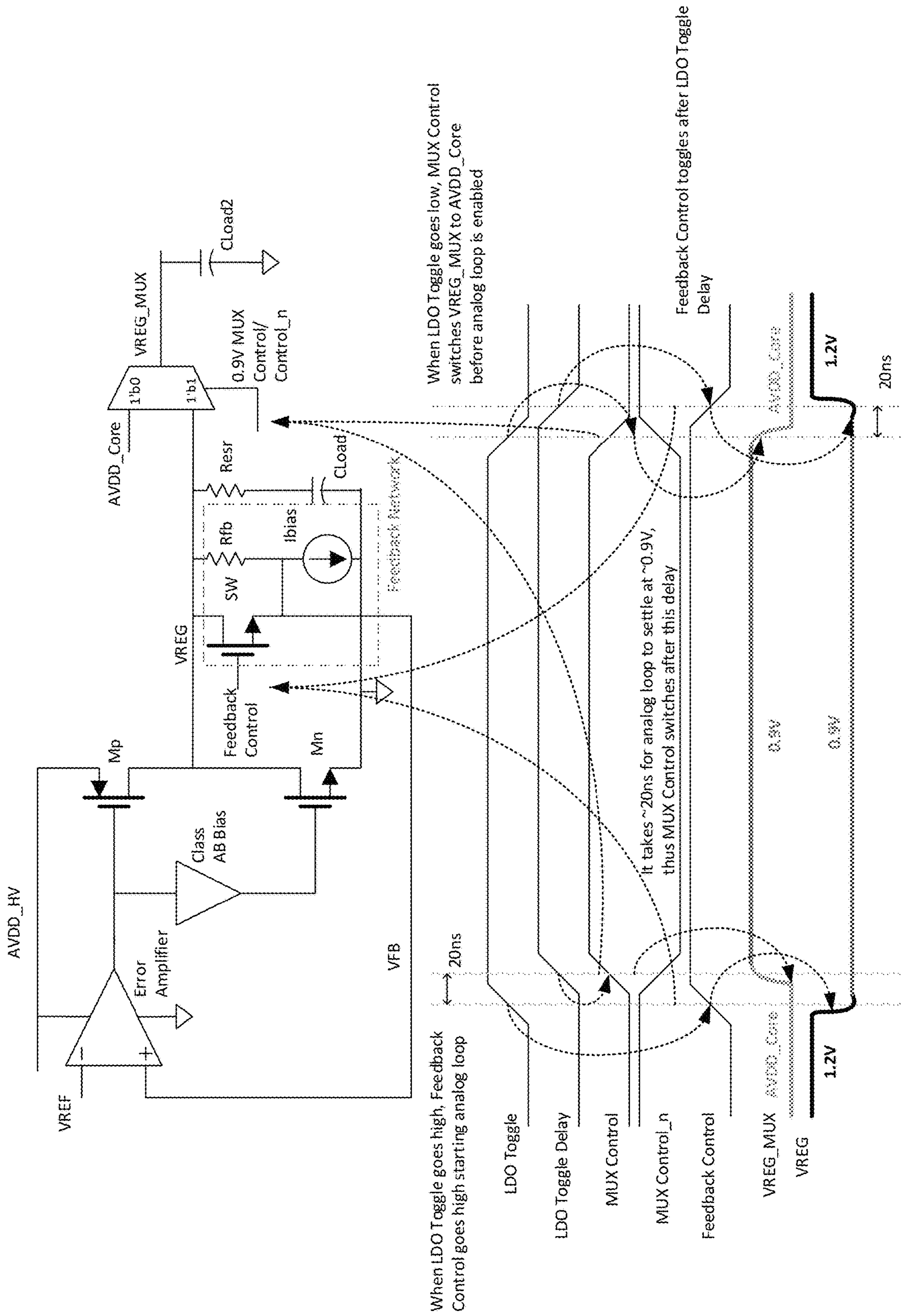
FIG. 13 shows an example plot showing feedback and multiplexer control signal timing consistent with an embodiment of the present disclosure.
Figure 14:
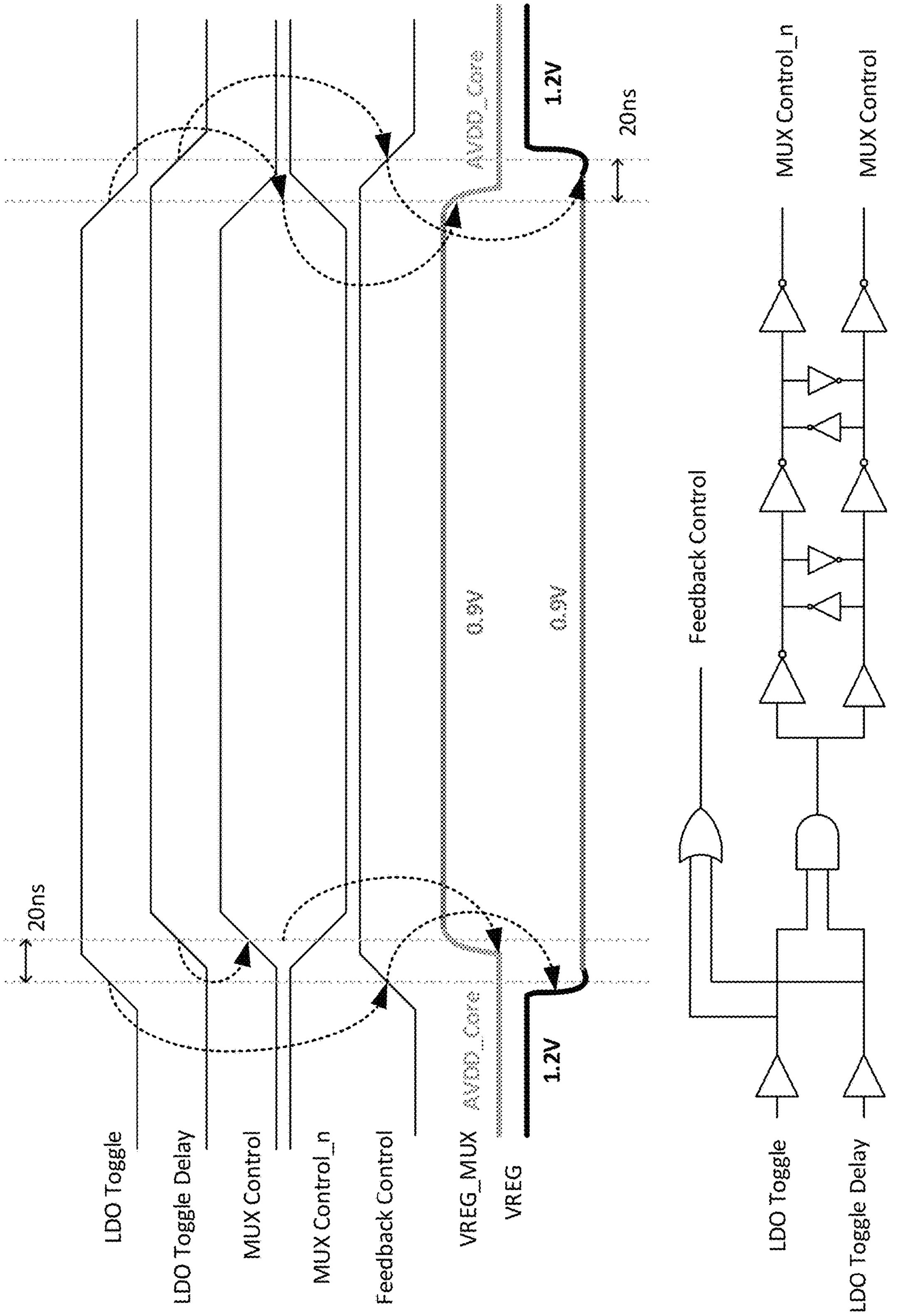
FIG. 14 shows an example plot showing feedback and multiplexer control implementation consistent with an embodiment of the present disclosure.
Figure 15:
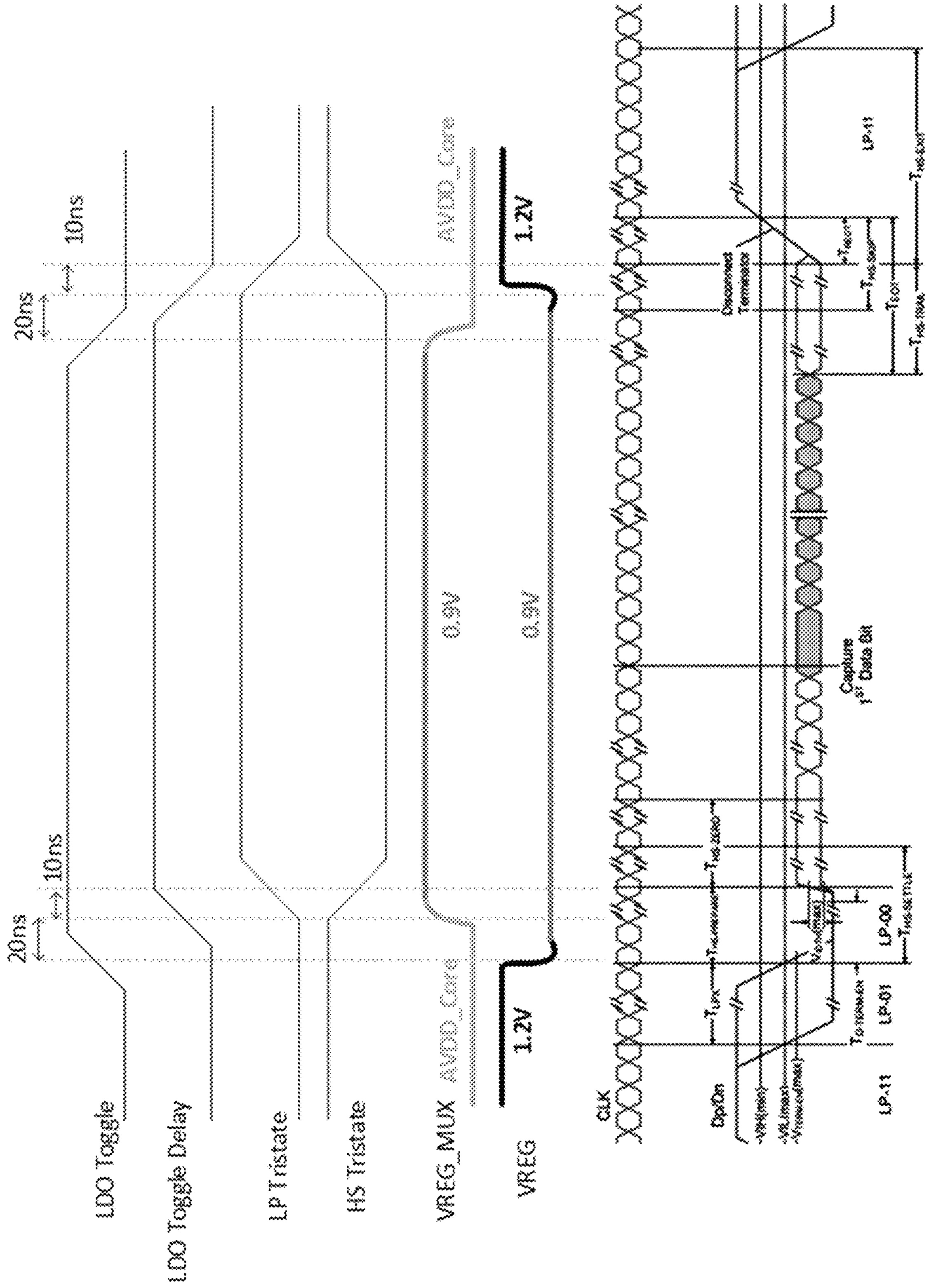
FIG. 15 shows an example of high speed data transmission in bursts consistent with an embodiment of the present disclosure.

Referring now to FIG. 13, an embodiment showing an example of feedback and MUX control signal timing is provided. FIG. 14 shows an example of feedback and MUX control implementation. FIG. 15 shows an example timing diagram depicting high-speed data transmission in bursts. More particularly, FIG. 15 depicts an example of LDO toggle signal timing vs. D-PHY1.2 timing specification.

Figure 16:
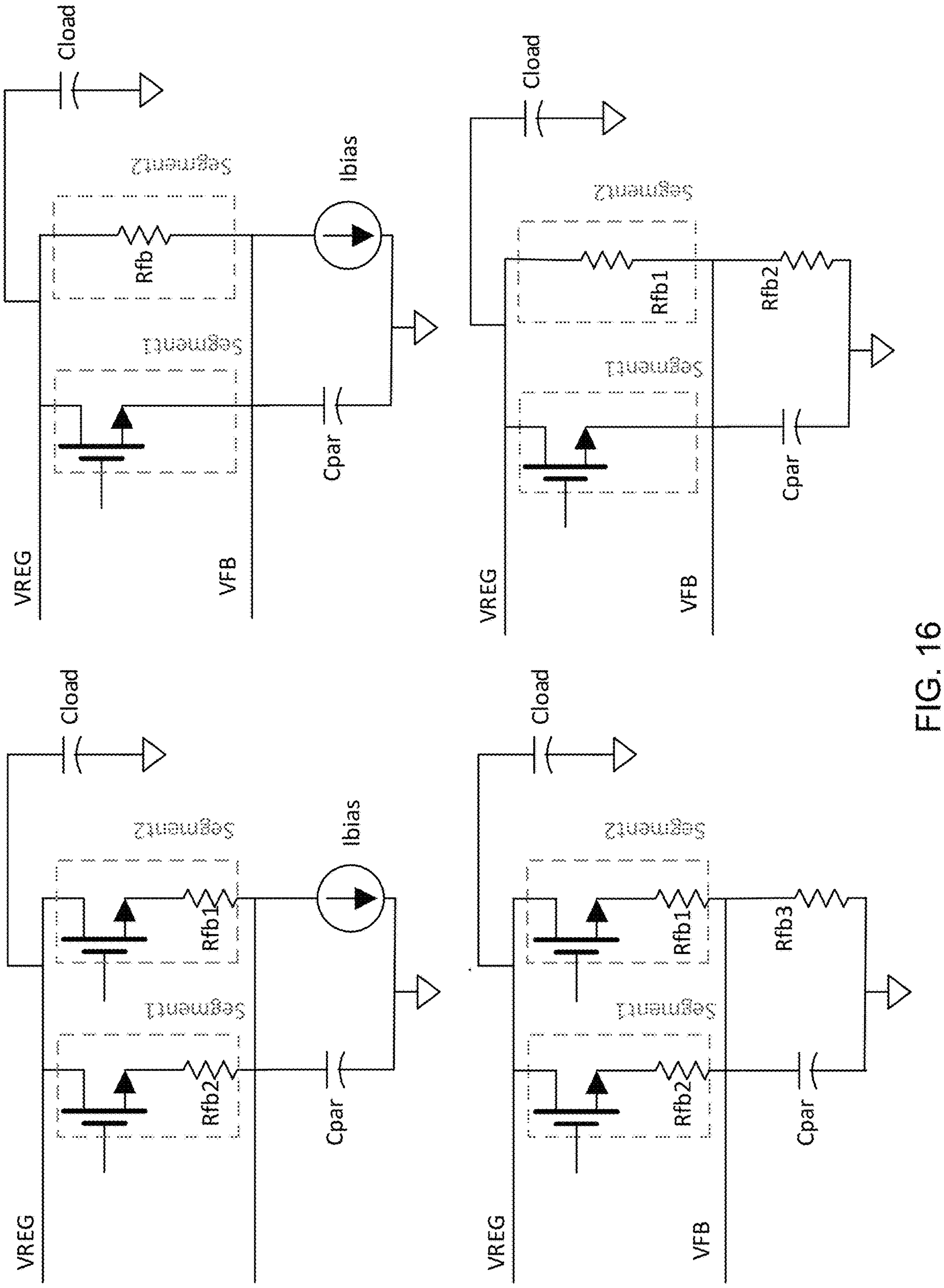
FIG. 16 shows examples of feedback network embodiments consistent with embodiments of the present disclosure.
Figure 17:
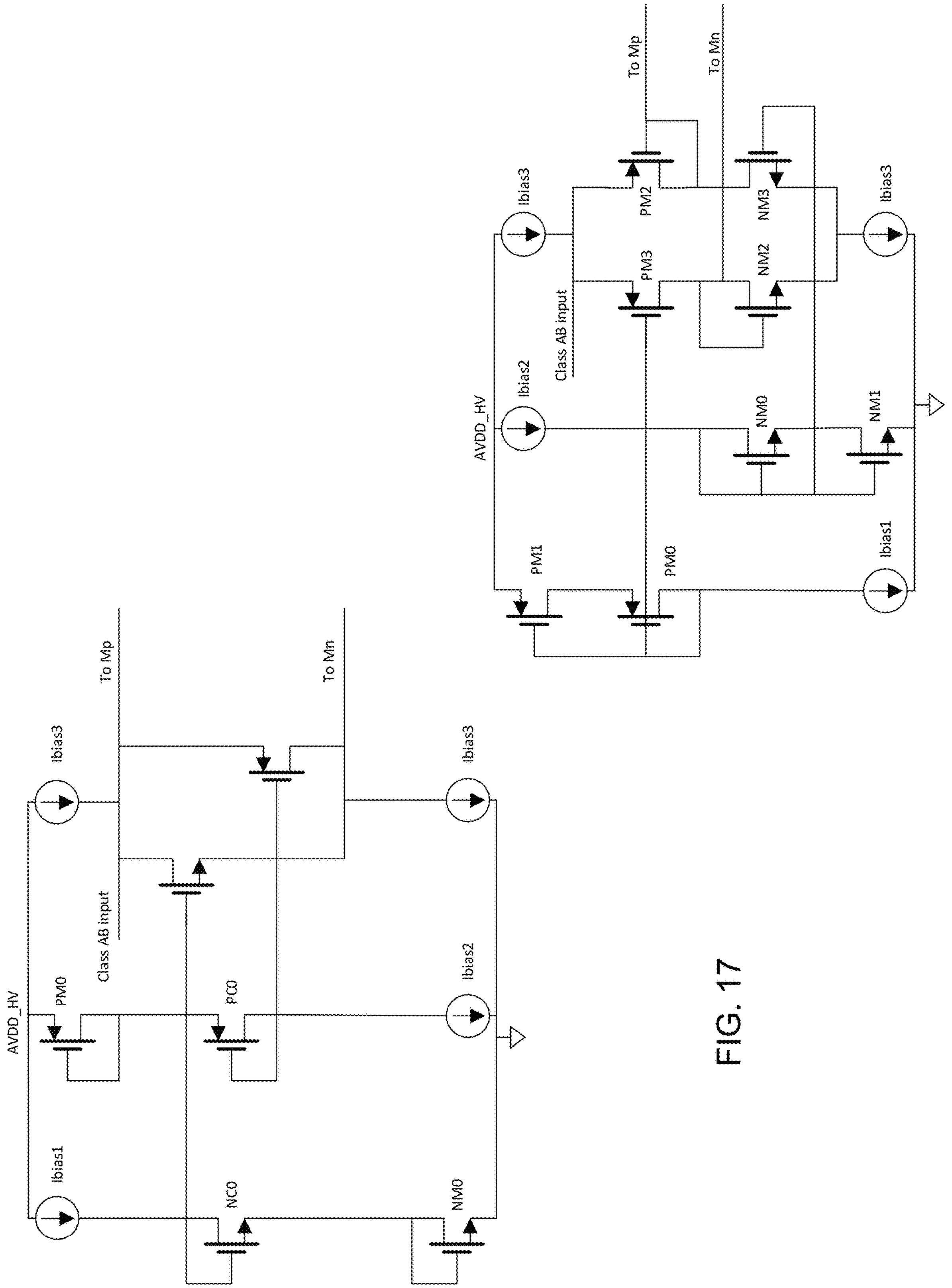
FIG. 17 shows examples of class AB biasing embodiments consistent with embodiments of the present disclosure.
Figure 18:
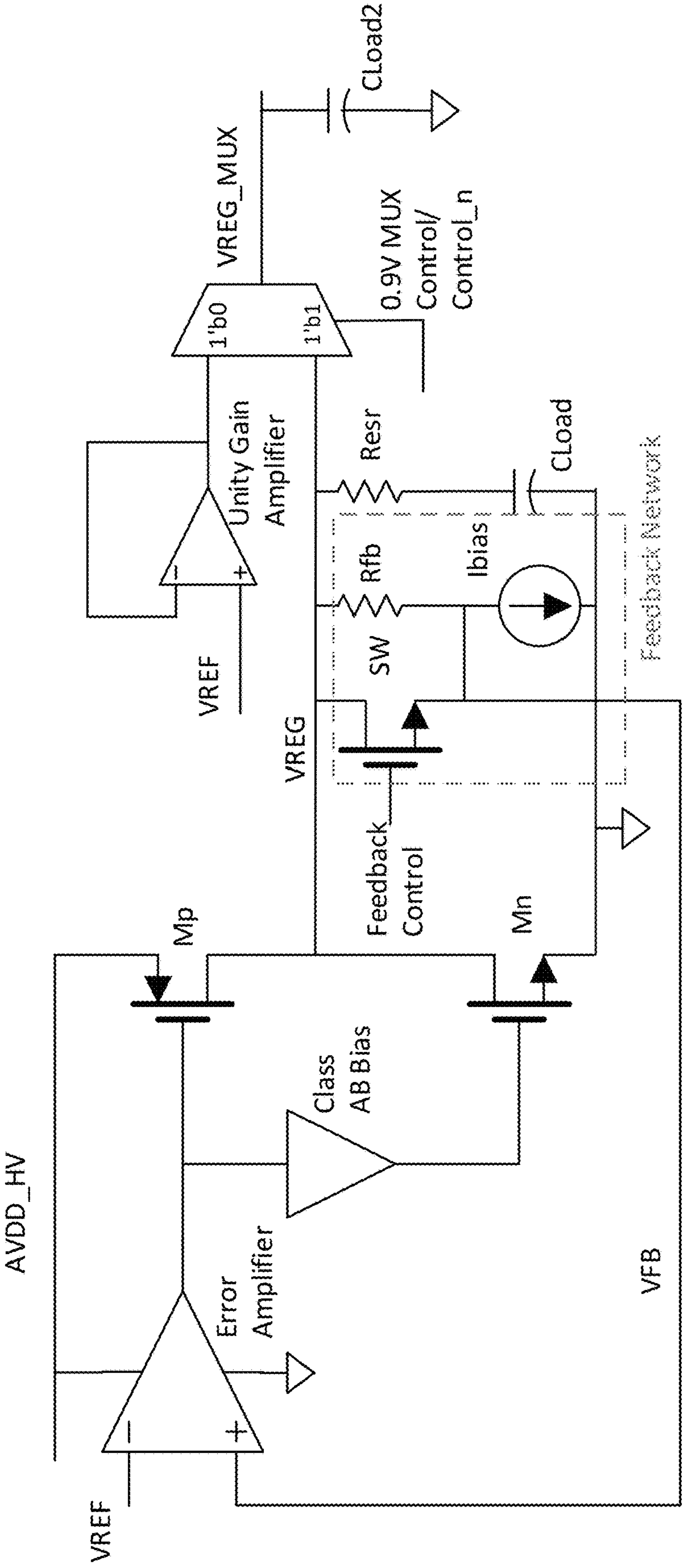
FIG. 18 shows examples consistent with alternative embodiments of the present disclosure.

Referring now to FIG. 16, a number of alternative embodiments consistent with the present disclosure are provided. Specifically, FIG. 16 depicts a variety of feedback network embodiments. FIG. 17 depicts alternative class AB biasing embodiments consistent with the present disclosure. An alternative circuit embodiment is provided in FIG. 18.

Figure 19:
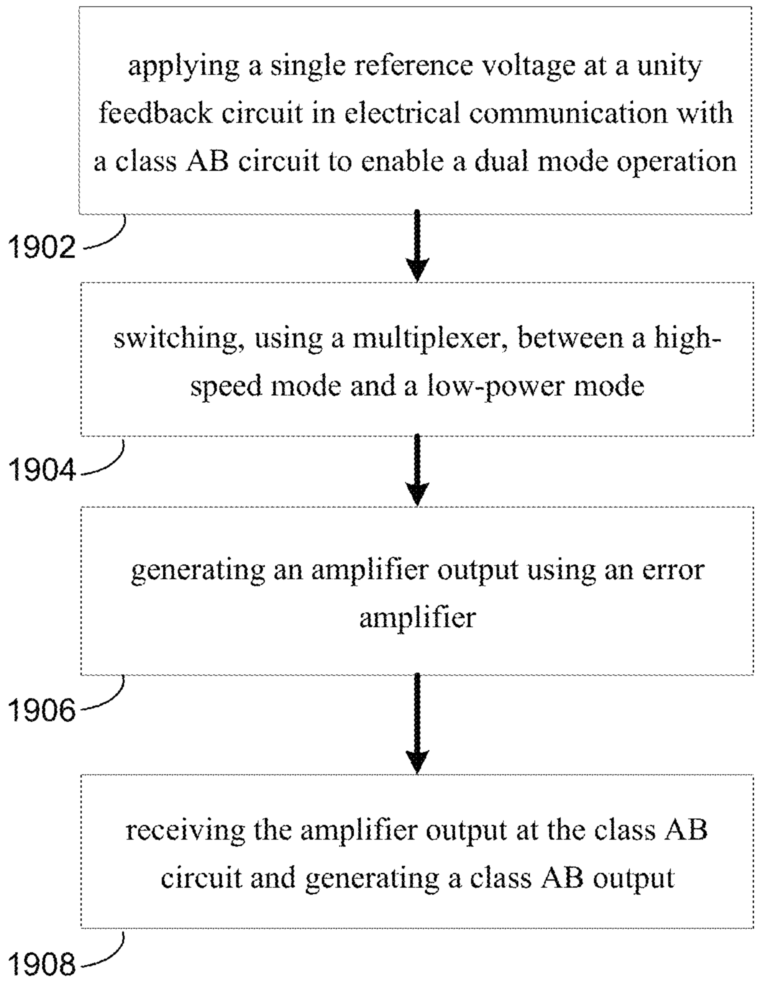
FIG. 19 shows a flowchart depicting operations consistent with an embodiment of the present disclosure.

Referring now to FIG. 19, a flowchart 1900 depicting one or more operations consistent with embodiments of the present disclosure is provided. Flowchart 1900 shows one example of a method of dual mode, low dropout regulator mode switching. The method may include applying (1902) a single reference voltage at a unity feedback circuit in electrical communication with a class AB circuit to enable a dual mode operation. The method may also include switching (1904), using a multiplexer, between a high-speed mode and a low-power mode. The method may further include generating (1906) an amplifier output using an error amplifier and receiving (1908) the amplifier output at the class AB circuit and generating a class AB output. Numerous additional operations are also within the scope of the present disclosure.

Embodiments of the circuitry described herein may include an LDO that uses a single reference voltage to achieve dual mode operation, by generating different, mode-specific regulated output voltages. The proposed LDO operates in a dual mode and is capable of fast transient switching between the modes. Fast switching between modes may be achieved using class AB and feedback switching schemes to reduce settling/transition time. For D-PHY applications, low power and high speed transmission may be mutually exclusive, hence depending on the mode (e.g., LP or HS) a single LDO may operate in a multiplexed manner to provide different supplies. For example, the low power mode uses 1.2V supply while for the high speed mode, the pre-driver circuit uses 0.9V supply. During low power transmission, the LDO output is at 1.2V The pre-driver circuit includes thin oxide, low threshold-voltage (Vth) devices that may be provided a low supply voltage (core supply) using an analog multiplexer circuit. The proposed logic circuit controls the analog feedback network and the analog multiplexer, to address reliability for thin-oxide (low Vth) devices in pre-driver circuit during mode transitions.

In some embodiments, the proposed LDO is a single LDO operating in a dual mode with a fast transient response. To achieve dual mode operation, the LDO may utilize feedback switching. This ensures bias points in the error amplifier remain similar across modes. The dual mode operation must have fast transient response when switching between modes to meet D-PHY timing specs. This fast transient response may be achieved using a class AB device operating in a unity feedback configuration for one of the modes. The proposed LDO has numerous advantages over existing approaches. For example, the low power and high speed transmission may be mutually exclusive, hence depending on the mode a single LDO may be operated in a multiplexed manner to provide different supply. Embodiments of the present disclosure may be scalable for higher data-rates. This provides for better power efficiency and stability for supporting higher data-rates, since the LDO needs to support one load (e.g., low power or high speed) at a time in a lane rather than all the lanes for different configurations. The absence of routing from CMN to far end DTX lane eliminates IR drop and bandwidth limitation for higher data-rates. Embodiments included herein are more area efficient as a single LDO serves dual purposes and the area of an additional lane LDO for the HS-TX pre-driver is avoided.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph (f) for any limitations of any of the claims herein, except for those in which the claim expressly uses the words 'means for' or 'step for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A dual mode, low dropout regulator circuit comprising:

- a multiplexer configured to switch between a high-speed mode and a low-power mode;
- an error amplifier configured to generate an amplifier output;
- a class AB circuit configured to receive the amplifier output and generate a class AB output;
- a unity feedback circuit in electrical communication with the class AB circuit, wherein a single reference voltage is applied to perform a dual mode operation, wherein the unity feedback circuit and the class AB circuit electrically communicate with the multiplexer to switch between the high-speed mode and the low-power mode.

2. The dual mode, low dropout regulator circuit of claim 1, wherein the low dropout regulator generates a first power supply in the low-power mode.

3. The dual mode, low dropout regulator circuit of claim 2, wherein the low dropout regulator generates a second power supply in a high speed mode.

4. The dual mode, low dropout regulator circuit of claim 1, wherein the low dropout regulator is included in a display PHY (D-PHY) architecture.

5. The dual mode, low dropout regulator circuit of claim 3, wherein the second power supply is provided to a pre-driver circuit.

6. The dual mode, low dropout regulator circuit of claim 5, wherein the pre-driver circuit is a thin oxide device.

7. The dual mode, low dropout regulator circuit of claim 1, wherein the unity feedback circuit includes at least one capacitor operatively connected to a plurality of resistors arranged in parallel.

8. The dual mode, low dropout regulator circuit of claim 1, further comprising:

- a controller configured to provide a toggle signal to the multiplexer.

9. The dual mode, low dropout regulator circuit of claim 3, wherein the first power supply is approximately 1.2 volts and the second power supply is approximately 0.9 volts.

10. A method of low dropout regulator mode switching, comprising:

- applying a single reference voltage at a unity feedback circuit in electrical communication with a class AB circuit to enable a dual mode operation;

switching, using a multiplexer, between a high-speed mode and a low-power mode;

generating an amplifier output using an error amplifier; and receiving the amplifier output at the class AB circuit and generating a class AB output, wherein the unity feedback circuit and the class AB circuit electrically communicate with the multiplexer to switch between the high-speed mode and the low-power mode.

11. The method of claim 10, wherein the low dropout regulator generates a first power supply in the low-power mode.

12. The method of claim 11, wherein the low dropout regulator generates a second power supply in the high-speed mode.

13. The method of claim 10, wherein the low dropout regulator is included in a display PHY (D-PHY) architecture.

14. The method of claim 12, wherein the second power supply is provided to a pre-driver circuit.

15. The method of claim 14, wherein the pre-driver circuit is a thin oxide device.

16. The method of claim 10, wherein the unity feedback circuit includes at least one capacitor operatively connected to a plurality of resistors arranged in parallel.

17. The method of claim 10, further comprising:

a controller configured to provide a toggle signal to the multiplexer.

18. The method of claim 12, wherein the first power supply is approximately 1.2 volts and the second power supply is approximately 0.9 volts.

* * * * *